(12) United States Patent
Hom

(10) Patent No.: US 12,021,213 B2
(45) Date of Patent: Jun. 25, 2024

(54) BATTERY WITH SELECTIVE PHASE CHANGE FEATURES

(71) Applicant: Wisk Aero LLC, Mountain View, CA (US)

(72) Inventor: Lewis Romeo Hom, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 17/337,331

(22) Filed: Jun. 2, 2021

(65) Prior Publication Data
US 2021/0384567 A1 Dec. 9, 2021

Related U.S. Application Data

(60) Provisional application No. 63/034,246, filed on Jun. 3, 2020.

(51) Int. Cl.
*H01M 10/659* (2014.01)
*H01M 10/613* (2014.01)
*H01M 10/647* (2014.01)

(52) U.S. Cl.
CPC ....... *H01M 10/659* (2015.04); *H01M 10/613* (2015.04); *H01M 10/647* (2015.04); *H01M 2220/20* (2013.01)

(58) Field of Classification Search
CPC ............. H01M 10/659; H01M 10/613; H01M 10/647; H01M 2220/20; H01M 10/6569; Y02E 60/10
See application file for complete search history.

(56) References Cited

U.S. PATENT DOCUMENTS 10,587,019 B2    3/2020  Wayne et al.
2013/0004806 A1  1/2013  Wang
(Continued)

FOREIGN PATENT DOCUMENTS

CA    2734258 A1 *  2/2010  ............. H01M 8/04
CN    106684504 A    5/2017
(Continued)

OTHER PUBLICATIONS

PCT/US2021/035555, "International Search Report and Written Opinion", dated Sep. 23, 2021, 9 pages.
(Continued)

*Primary Examiner* — Kaity V Chandler
(74) *Attorney, Agent, or Firm* — Kilpatrick Townsend & Stockton LLP

(57) ABSTRACT

Embodiments provide battery cells and/or battery submodules including a phase change material (PCM) for absorbing excess heat that may be released within the battery cell and/or battery submodule. The PCM may be provided in form of a layer within the battery cell in addition to a thermal insulation layer. Alternatively, the PCM layer may replace the thermal insulation layer. The PCM may be provided on one or more sides of the battery submodule within a container that contains the battery submodule. The PCM may be a solid PCM provided in form of a layer and/or one or more strips. The PCM may also include a liquid PCM that is provided in the container containing the battery submodule.

20 Claims, 10 Drawing Sheets

(56) References Cited

U.S. PATENT DOCUMENTS

| | | | |
|---|---|---|---|
| 2015/0035370 A1* | 2/2015 | Wyatt | B60L 58/20 |
| | | | 307/77 |
| 2015/0037634 A1* | 2/2015 | Malcolm | H05K 1/18 |
| | | | 429/90 |
| 2015/0037647 A1* | 2/2015 | Nguyen | H01M 10/6555 |
| | | | 429/120 |
| 2015/0037649 A1 | 2/2015 | Wyatt et al. | |
| 2017/0170439 A1 | 6/2017 | Jarvis et al. | |
| 2018/0083330 A1 | 3/2018 | Xiang | |
| 2018/0287231 A1* | 10/2018 | Iyengar | H01M 50/24 |
| 2018/0320987 A1 | 11/2018 | Da Silva et al. | |
| 2019/0273295 A1* | 9/2019 | Chan | H01M 10/613 |
| 2020/0067152 A1* | 2/2020 | Jeon | H01M 10/625 |
| 2021/0104793 A1* | 4/2021 | Parkanzky | H01M 10/6569 |

FOREIGN PATENT DOCUMENTS

| | | | | |
|---|---|---|---|---|
| CN | 206878135 U | * | 1/2018 | Y02E 60/10 |
| CN | 206893643 U | | 1/2018 | |
| CN | 108199112 A | * | 6/2018 | H01M 10/613 |
| CN | 109073329 A | * | 12/2018 | F28D 20/026 |
| CN | 109509935 A | * | 3/2019 | H01M 10/613 |
| CN | 111082185 A | * | 4/2020 | |
| JP | 2016524281 A | | 8/2016 | |
| KR | 20140081972 A | * | 7/2014 | H01M 10/613 |
| WO | 2020055004 A1 | | 3/2020 | |
| WO | WO-2020055004 A1 | * | 3/2020 | H01M 10/0525 |

OTHER PUBLICATIONS

PCT/US2021/035555, "International Preliminary Report on Patentability", dated Dec. 15, 2022, 7 pages.

Bashirpour-Bonab, "Thermal Behavior of Lithium Batteries Used in Electric Vehicles Using Phase Change Materials", International Journal of Energy Research, vol. 44, Apr. 23, 2020, pp. 12583-12591.

CA3182972, "Office Action", Mar. 19, 2024, 6 pages.

Hallaj et al., "A Novel Thermal Management System for Electric Vehicle Batteries Using Phase-Change Material", Journal of The Electrochemical Society, vol. 147, No. 9, Sep. 2000, pp. 3231-3236.

* cited by examiner

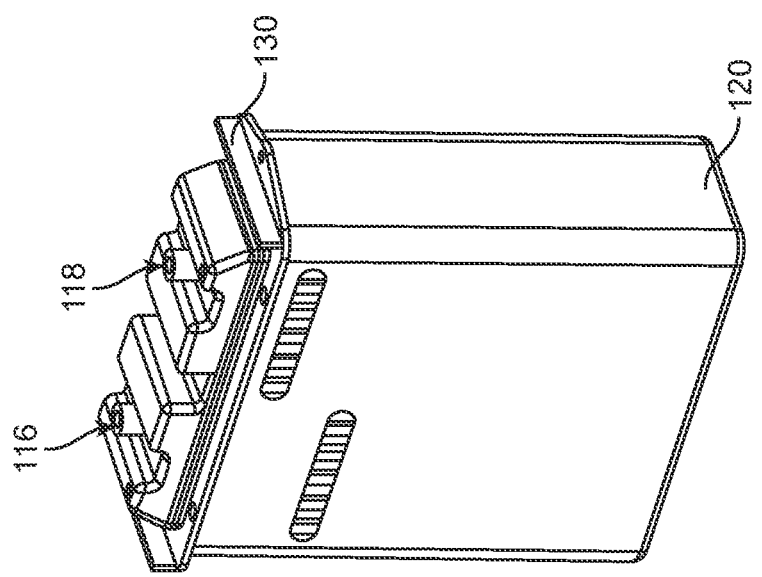
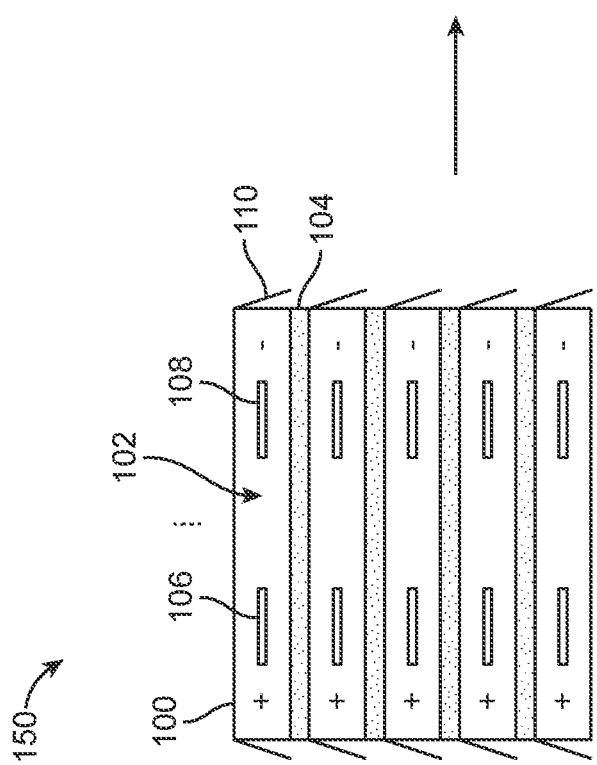
FIG. 1B
FIG. 1A

BATTERY WITH SELECTIVE PHASE CHANGE FEATURES

CROSS-REFERENCES TO RELATED APPLICATIONS

This application claims benefit under 35 USC § 119(e) to U.S. Provisional Patent Application No. 63/034,246 filed Jun. 3, 2020 and entitled "Battery with Selective Phase Change Features," the disclosure of which is incorporated by reference herein in its entirety for all purposes.

BACKGROUND OF THE INVENTION

A battery is an electrochemical device that can convert stored chemical energy to electrical energy. Numerous examples of battery technologies are known in the art, including lithium ion batteries, nickel-metal-hydride batteries, lead-acid batteries, nickel-cadmium batteries, alkaline batteries, and so on. Batteries can be made in many sizes and with a range of operating characteristics (e.g., voltage (or electrical potential), maximum current, charge capacity, and so on). To support high voltage or high charge capacity, battery packs can be made by electrically connecting multiple battery cells in series and/or in parallel. Depending on the technology, some types of batteries can be rechargeable by connecting to a source of charging current.

Batteries (particularly lithium-ion batteries) have found a wide variety of uses, including as a portable power source to drive the motors of vehicles such as cars, aircraft, watercraft, and so on. In some cases, a battery or battery pack may be the sole power source for a vehicle. A vehicle that relies solely on battery power for propulsion may abruptly lose its motive power if the battery fails. Depending on the state of the vehicle when a battery failure occurs, the consequences can range from inconvenient to disastrous.

Multiple cells are often needed to reach higher voltages and store sufficient energy to make the battery effective for its intended use. Multiple battery cells may be packaged together into a battery submodule. One or more cells in a battery submodule may fail in the form of an exothermal process called thermal runaway. A thermal runaway process in a cell may be caused by manufacturing defects, mishandling or abuse of cells or any factor that raises a cell's temperature, or exposes the cell to high temperatures from an external source. The high temperatures often cause an increase in reaction rates in the cells, thereby causing a further increase in their temperature and therefore a further increase in the reaction rate. As a result of this runaway process, cells in a battery submodule release a large amount of heat into areas surrounding the cell.

Since cells of a battery submodule are often packed very closely together, if one cell in a part of an assembly of cells experiences thermal runaway, the high temperature of that failed cell can trigger thermal runaway of nearby cells (e.g. a thermal runaway propagation). Such a process may cause the nearby cells to release heat and propagate the thermal runaway process throughout the remaining cells in the battery, causing a cascading failure of the battery and releasing a large amount of energy. Accordingly, it may be desirable to manufacture batteries that reduce the risk of thermal runaways from occurring.

SUMMARY

Described herein are examples (or embodiments) of battery submodule including a phase change material (PCM) for absorbing excess heat that may be released within the battery cell and/or battery submodule. In the case of a failing battery cell or other situation with an undesired rise in local temperature, the phase change material can provide an emergency cooling effect that limits the temperature increase and prevents a thermal runaway event.

According to various embodiments, a battery submodule includes a container; a battery stack formed of one or more battery cells provided within the container; and a phase change material layer provided within the container. The phase change material is configured to absorb heat released from the battery stack. The battery submodule may also include one or more insulation layers stacked with the one or more battery cells in the battery stack. The container may be configured to compress the battery stack and the phase change material provided therein.

In some embodiments, the phase change material includes one or more solid layers of phase change material stacked with the one or more battery cells. The one or more solid layers of phase change material are provided between the one or more battery cells. The one or more solid layers of phase change material may be provided on a top or bottom surface of the battery stack. The one or more solid layers of phase change material may be provided one or more side surfaces of the battery stack. According to some embodiments, the phase change material may envelop the battery stack in the container.

According to various embodiments, at least one layer in the battery stack may be impregnated with the phase change material. The phase change material includes intumescent coating.

In some embodiments, the phase change material includes a predetermined amount of liquid phase change material provided within the container. The battery stack is at least partially immersed in the liquid phase change material. The predetermined amount may be about 1 milliliter to about 30 milliliters.

Some embodiments are directed to a method of manufacturing a battery submodule including a container; a battery stack formed of one or more battery cells provided within the container; and a phase change material layer provided within the container. The phase change material is configured to absorb heat released from the battery stack. The battery submodule may also include one or more insulation layers stacked with the one or more battery cells in the battery stack. The method may also include calculating an energy to be released from the battery stack in case of failure; and determining a thickness of the phase change material layer based on a latent heat of fusion of phase change material and the energy to be released from the battery stack.

Some embodiments are directed to a method of manufacturing a battery submodule, the method comprising inserting a battery stack formed of one or more battery cells into a container; and adding liquid phase change material into the container such that at least a portion of the battery stack is immersed in the liquid phase change material. The liquid phase change material is configured to absorb heat released from the battery stack. The method may also include testing a performance of the battery submodule; comparing the performance of the battery submodule to a predetermined threshold; and adjusting an amount of the liquid phase change material based on the comparing. The adjusting may include adding a predetermined amount of the liquid phase change material to container; or removing a predetermined amount of the liquid phase change material from the container.

BRIEF DESCRIPTION OF THE DRAWINGS

Various embodiments of the invention are disclosed in the following detailed description and the accompanying drawings.

FIG. 1A illustrates a top view of stacked (e.g., layered) contents of an exemplary battery submodule.

FIG. 1B illustrates an exemplary battery submodule provided in a container which surrounds and compresses the stacked contents of the battery submodule.

DETAILED DESCRIPTION

Figures 2A, 2B:
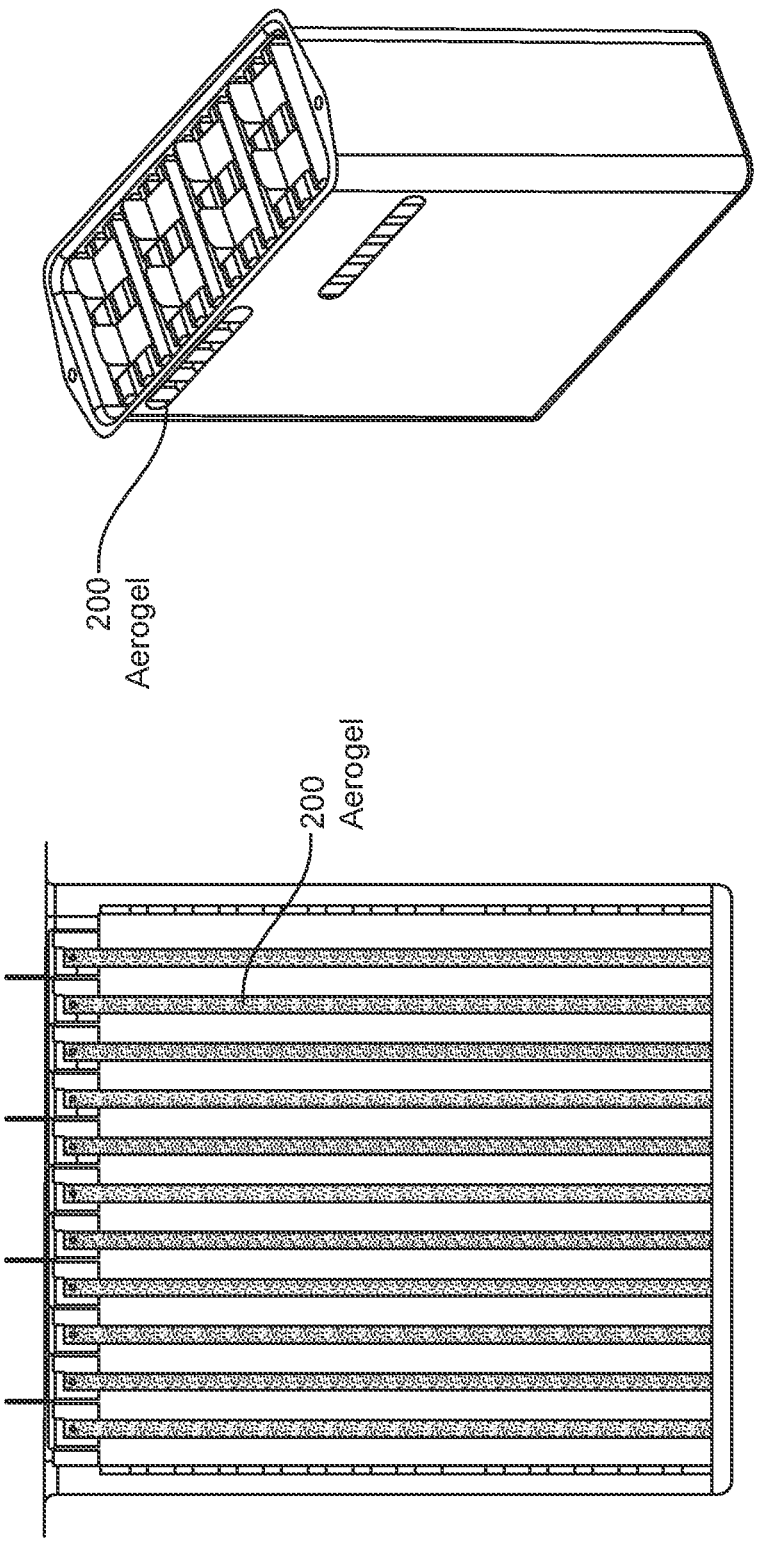
FIG. 2A illustrates a side view of an exemplary battery submodule with aerogel used as a thermally insulating layer.
FIG. 2B illustrates a perspective view of an exemplary battery submodule with aerogel used as a thermally insulating layer.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention. Unless stated otherwise, a component may be implemented as a general component that is temporarily configured to perform the task at a given time or a specific component that is manufactured to perform the task.

Embodiments provide battery cells and/or battery submodules including a phase change material (PCM) for absorbing excess heat that may be released within the battery cell and/or battery submodule. According to various embodiments, the PCM may be provided in form of a layer within the battery cell in addition to a thermal insulation layer. Alternatively, the PCM layer may replace the thermal insulation layer. In some embodiments, the PCM may be provided on one or more sides (e.g., bottom, top, front, back) of the battery submodule within a container that contains the battery submodule. The PCM may be a solid PCM provided in form of a layer and/or one or more strips. Yet in other embodiments, the PCM material is a liquid PCM that is provided in the container containing the battery submodule. Various implementation of PCM in a battery cell/submodule discussed herein (e.g. a solid PCM layer, one or more solid PCM strips, liquid PCM) may be provided on its own or in any reasonable combination thereof.

Exemplary Battery Submodule(s)

First, it may be helpful to explain components of a battery cell and a battery submodule. FIG. 1A illustrates a top view of the stacked (e.g., layered) contents of an exemplary battery submodule 150, including battery cells, thermally insulating layers, and thermally conducting layers. FIG. 1B illustrates a battery submodule 150 provided in a container 120 (e.g. a metal can) which surrounds and compresses the stacked contents of the battery submodule 150.

The battery submodule 150 may be used to power a vehicle such as an aircraft, watercraft, rail vehicle, car, truck, off-road vehicle, personal transporter (e.g., skateboard or scooter), electric bicycle, or the like. The battery submodule 150 can be any type of battery, including a lithium ion battery, lead-acid battery, nickel-metal-hydride battery, and so on. The battery submodule 150 can be implemented as a single battery cell or as a battery pack that includes multiple battery cells connected together in series and/or in parallel as desired. As used herein, the term "battery cell" or "cell" can be understood as including a standalone battery or, in the case of a battery submodule, one of some number of independently replaceable battery units within the battery submodule.

As shown in FIG. 1A, the stacked content of an exemplary battery submodule 150 may include a repeated pattern which includes a thermally conducting layer 100, a battery cell 102 and a thermally insulating layer 104. In some embodiments, the thermally conducting layer 100 may include fins 110 on one or both sides. In some embodiments, each battery submodule 150 includes 12 battery cells and a corresponding number of thermally insulating layers and thermally conducting layers. No specific beginning and ending to the stacking pattern is shown here and any appropriate beginning and ending layer(s) may be used. In some embodiments, the stacked layers may begin and end with two thermally insulating layers. An additional PCM layer may be provided on one or both sides of the thermally insulating layers (e.g. to sandwich the battery submodule 150), as discussed below in greater detail.

In some embodiments, the thermally conducting layer 100 may act as a heat sink for the battery cell 102 in contact with that thermally conducting layer. By distributing the heat produced by the battery cell (e.g., during normal operation and/or a catastrophic failure) from the interior of the stacked layers to the exterior, the thermally conducting layer 100 prevents nearby battery cells from overheating and possibly failing. In some embodiments, the thermally conducting layer 100 may be made of metal (e.g., 1235 series Al) due to good thermal conducting properties of the metal.

According to various embodiments, the battery cell 102 may be a pouch cell. Pouch cells perform better when pressure is applied (e.g., ~3-5 PSI). More specifically, the cycle life of pouch cells can be extended by applying pressure to the pouch cells. Accordingly, the stacked layers illustrated in FIG. 1A may be compressed using a metal container 120 as shown in FIG. 1B.

FIG. 1B is a perspective view of the stacked contents of a battery submodule 150, including a container 120 which compresses the contents of the container. As shown in FIG. 1A, each battery cell 102 of the battery submodule 150 may include a positive tab 106 and a negative tab 108. Each positive tab 106 can be connected electrically and each negative tab 108 can be connected electrically. As a result, when the contents of the container 120 are sealed with a lid 130 (as shown in FIG. 1B), the lid 130 exposes a single positive connection 116 or port and a single negative connection 118 or port.

Referring back to FIG. 1A, the thermally insulating layers 104 may prevent (or at least slow down and/or mitigate) heat from spreading from one cell to another cell. For example, in the event of one cell failing catastrophically, a large amount of heat is released from the failing cell. Without any insulation, all of that heat would propagate to nearby cells and cause those cells to also fail catastrophically. Eventually, all of the cells would fail catastrophically in a domino-like effect. This domino-like effect is sometimes referred to as a thermal runaway propagation. A thermal runaway may occur when a single battery cell undergoes an unstoppable temperature rise due to exothermic chemical reactions. When one cell's thermal runaway causes another cell to go into thermal runaway, the effect may be referred as a thermal runaway propagation event (or simply thermal runaway propagation). The thermally insulating layers 104 may prevent (or at least slow down and/or mitigate) thermal runaway from happening.

The thermally insulating layer 104 may be made of a material which can withstand (e.g., without collapsing) the expected pressure from the metal container 120. For example, using the spring constant of a material as a metric of interest, the spring constant of the thermally insulating layer 104 should be non-negligible. In some embodiments, the thermally insulating layer 104 may be made of aerogel which is a good thermal insulator and has a non-negligible spring constant. FIGS. 2A-2B illustrate a battery submodule with aerogel 200 used as a thermally insulating layer.

The thermally insulating layers are poor thermal conductors, and thereby contain excess heat within an overheating battery cell. Excess heat is still transmitted to other areas of the battery submodule, but the rate of transmission is slowed. Also, thermally insulating layers can be used to direct heat away from nearby battery cells and toward other areas of the battery submodule (e.g., other components and non-neighboring battery cells) by increasing the thermal resistance between the overheating battery cell and other nearby battery cells. As a result, an overheating battery cell does not quickly pass large amounts of heat to other nearby battery cells. Instead, heat can be both directed toward further areas as well as slowly released to nearby areas, and then the nearby areas continue dissipating the heat to further areas of the battery submodule. The slow release of heat allows extra time for the excess heat to be passed to further areas of the battery submodule, and effectively distributed more uniformly around the battery submodule, instead of collecting in local areas. The thermally insulating layers can thereby prevent specific local areas of the submodule outside of a failing battery cell from reaching a critical temperature (e.g. 200° C.). The thermally insulating layer may achieve this goal by (1) extending the time that it will take the submodule to reach the critical temperature, and (2) making heat transfer to the highly conductive submodule exterior more favorable than heat transfer to neighboring battery cells, thus increasing temperature uniformity throughout the submodule and preventing any one part form approaching the critical temperature. Thus, the thermally insulating layers effectively cause the heat to be distributed more uniformly and to a lower temperature in the battery submodule.

However, in some cases, even when the temperature is distributed uniformly to all cells of the battery submodule, the temperature may still exceed the critical temperature.

Battery Submodules with PCM

Embodiments discussed herein provide a phase change material (PCM) in the battery submodule to prevent the battery submodule from reaching the critical temperature. While the PCM may be used in connection with the thermally insulating layers described above, in some embodiments, the PCM may be used on its own (e.g. the thermally insulating material may be formed of, or replaced with, PCM). Instead of spreading the heat through the battery submodule (e.g. dissipating the heat emanating from one battery cell to one or more of the neighboring cells, or other cells in the battery submodule), the PCM absorbs the extra heat to reconfigure the bonds between the molecules of the PCM. That is, the PCM absorbs the heat to transition from one phase (e.g. solid, gel) to another phase (e.g. liquid).

During the phase change process of the PCM, absorbed heat energy that causes the phase change does not cause a temperature increase within the PCM. As a result, the PCM can absorb heat within the battery submodule without undergoing an increase in temperature. Due to this effect, the PCM can provide a temperature ceiling within the batter submodule. The temperature ceiling (also referred to as an isothermal boundary condition) can be at or around the temperature at which the PCM undergoes the phase change process. The temperature ceiling can prevent an uncontrolled increase in temperature within battery submodule. For example, if one battery cell fails, the PCM can absorb the excess heat from that battery cell so that the heat does raise the temperature of the rest of the battery submodule or otherwise affect other battery cells. As a result, the PCM can provide an emergency cooling effect in the case of an uncontrolled increase in local temperature. The PCM-provided emergency cooling effect can be sufficient to contain the heat produced by a battery cell failure and thereby prevent a catastrophic event such as a thermal runaway.

The amount of heat that the PCM can absorb during its phase change without undergoing a temperature increase is a function of the latent heat of the material and the amount of the material. These factors (e.g., the material type and size of the PCM) can be configured so that the PCM is able to absorb and contain enough heat to prevent a thermal runaway (or other overheating concern).

Additionally, the type of PCM may be chosen based on the temperature at which the PCM undergoes a phase change. In order to prevent damage to one or more battery cells, it may be desirable to limit the temperature within the battery submodule to below a certain predetermined temperature. A PCM may be used that undergoes a phase change at or below that certain predetermined temperature in order to establish a temperature ceiling at or below the certain predetermined temperature. For example, a critical temperature may be the temperature at which the battery cells are prone to failure or an uncontrolled increase in overheating. A PCM may be chosen that undergoes a phase change at a specific temperature that is below the critical temperature.

Figure 8:
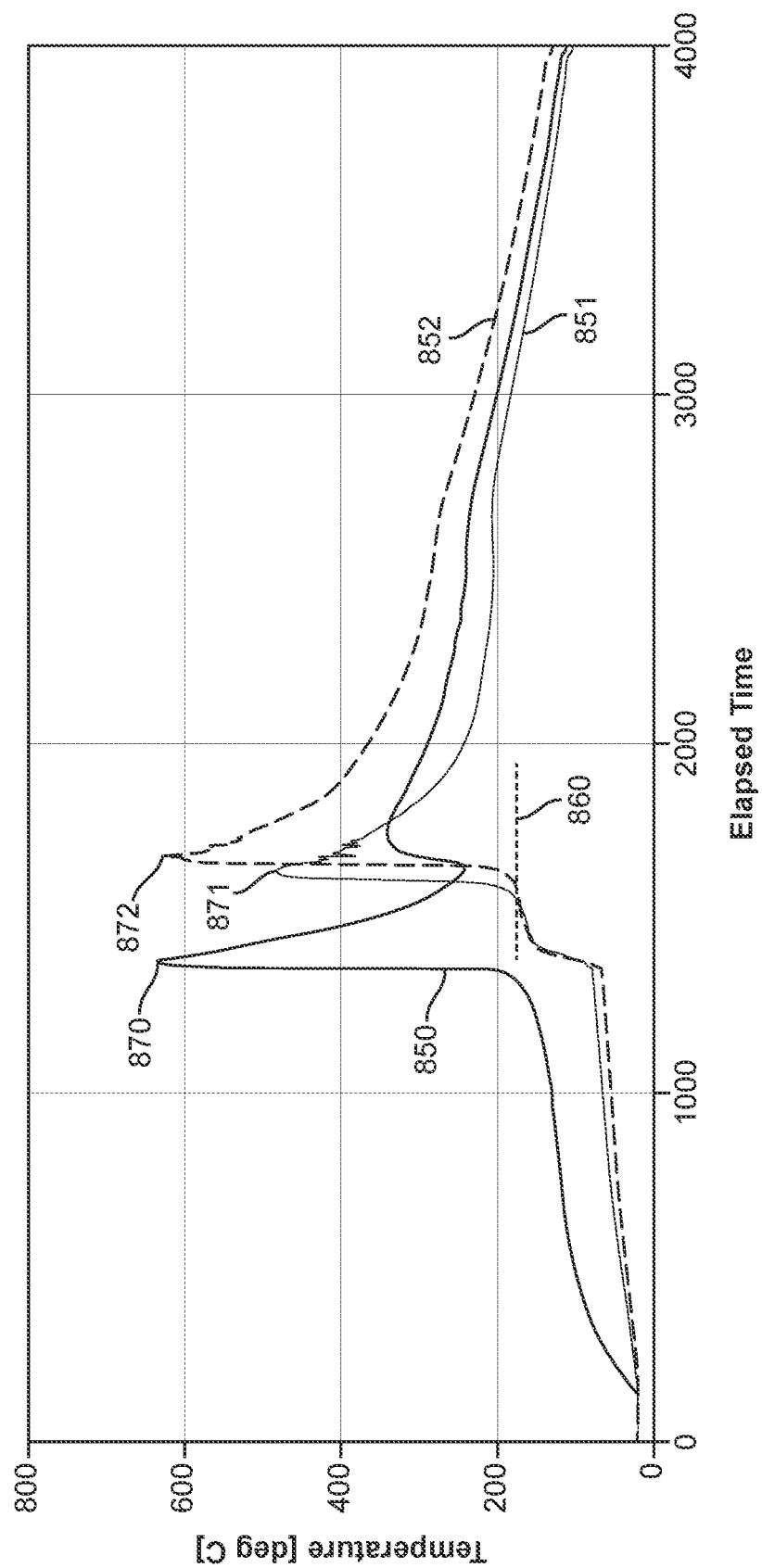
FIG. 8 illustrates an example of a thermal runaway event, where the first curve represents the temperature of a failing battery cell, according to conventional systems.

FIG. 8 illustrates an example of a thermal runaway event. The first curve 850 represents the temperature of a failing battery cell in conventional battery systems that does not include a PCM layer. The temperature of the first, failing, battery cell spikes as the failure occurs, the temperature spiking up to a first peak temperature 870. The temperature spike of the first battery cell causes a large amount of heat to dissipate into the battery submodule and other battery cells. A second curve 851 and third curve 852 represent the temperature of two other battery cells within the battery submodule, which may be adjacent to the first battery cell or nearby the first battery cell. As the first failing battery cell leaks heat, it causes the temperatures of the second battery cell and third battery cell to increase. Once the second battery cell and third battery cell reach a certain critical temperature 860, those battery cells also undergo failure and an uncontrolled spike in temperature. As shown by the second curve 851, the temperature of the second, failing, battery cell spikes as the second failure occurs, the temperature spiking up to a second peak temperature 871. As shown by the third curve 852, the temperature of the third, failing, battery cell spikes as the third failure occurs, the temperature spiking up to a third peak temperature 872. There is a time lag between the failure of the first battery cell (as shown by temperature peak 870) and the failures of the second and third battery cells (shown by temperature peaks 871 and 872) due to the time needed for heat to dissipate from the first battery cell to the second and third battery cells. This propagation of uncontrolled temperature increase across multiple battery cells is a thermal runaway event. The critical temperature 860 varies depending on the type of battery cell. In this example, the critical temperature 860 is about 175 degrees Celsius.

Figure 9:
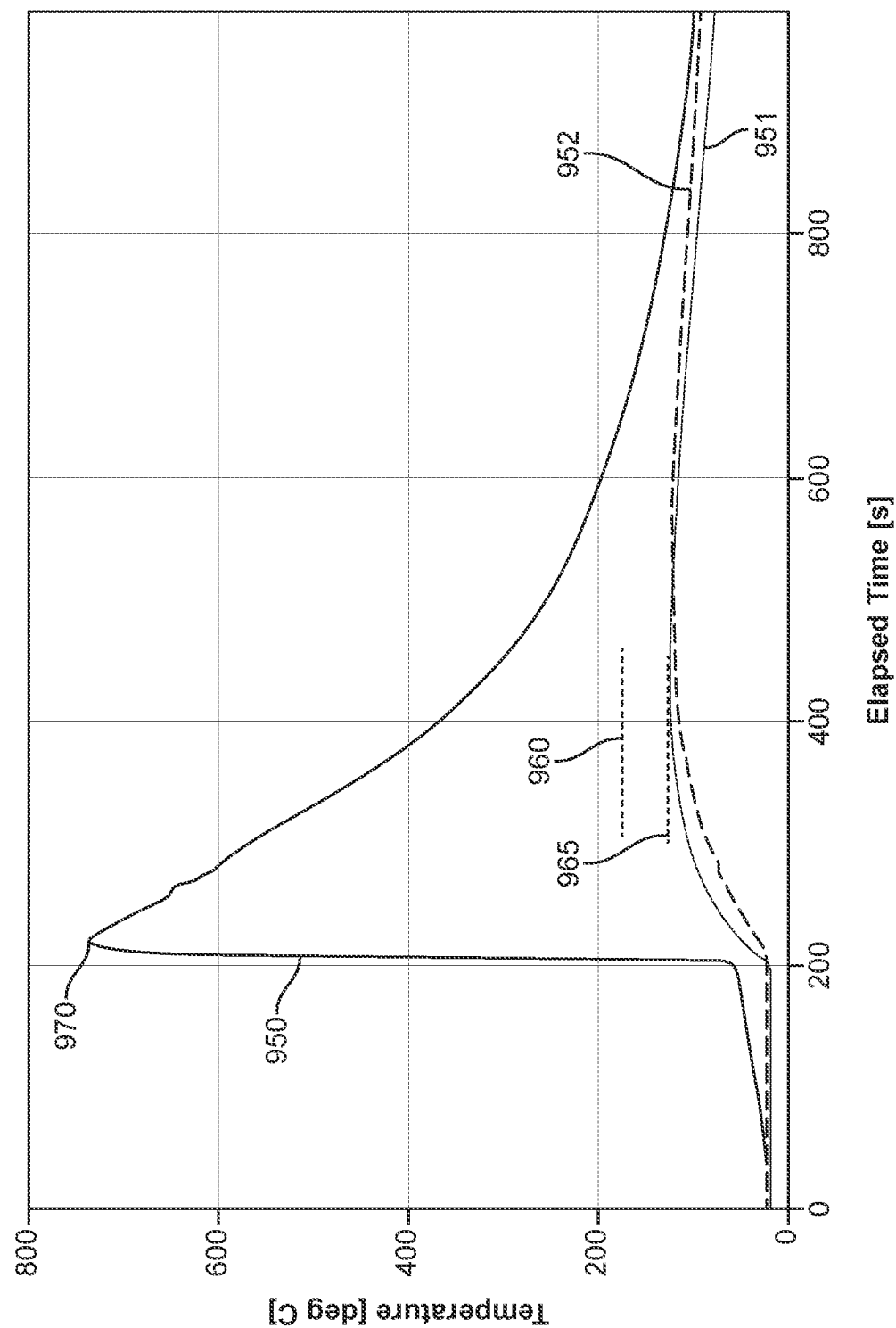
FIG. 9 illustrates an example of a thermal runaway event being prevented by PCM within a battery submodule, according to various embodiments.

FIG. 9 illustrates an example of a thermal runaway event being prevented by PCM within the battery submodule according to various embodiments. The first curve 950 represents the temperature of a failing battery cell. The temperature of the first, failing, battery cell spikes as the failure occurs, the temperature spiking up to a first peak temperature 970. As a result of the temperature spike of the first battery cell, a large amount of heat is produced. The excess heat is absorbed by the PCM, thereby preventing the temperature from increasing at other battery cells and other areas of the battery submodule. The PCM may undergo phase change at a certain phase change temperature 965. As a result, the temperature within the battery submodule and at other battery cells outside of the failing battery cell may not increase beyond the phase change temperature 965 (e.g., as long as at least some of the PCM has not yet changed phase). Since the phase change temperature 965 is less than a critical temperature 960 at which other battery cells may fail, the PCM prevents other battery cells from reaching the critical temperature 960 and failing. This is shown by the second curve 951 and third curve 952 which represent the temperature of two other battery cells within the battery submodule. The temperature of these other battery cells may reach the phase change temperature 965, but not the critical temperature 960. As a result, uncontrolled temperature rise in the second battery cell and third battery cell is prevented, and a thermal runaway event is prevented. The critical temperature 960 depends on the type of battery cell, and the phase change temperature 965 depends on the type of PCM. In this example, the critical temperature 960 is about 175 degrees Celsius, and the phase change temperature 965 is about 130 degrees Celsius.

Figure 3A:
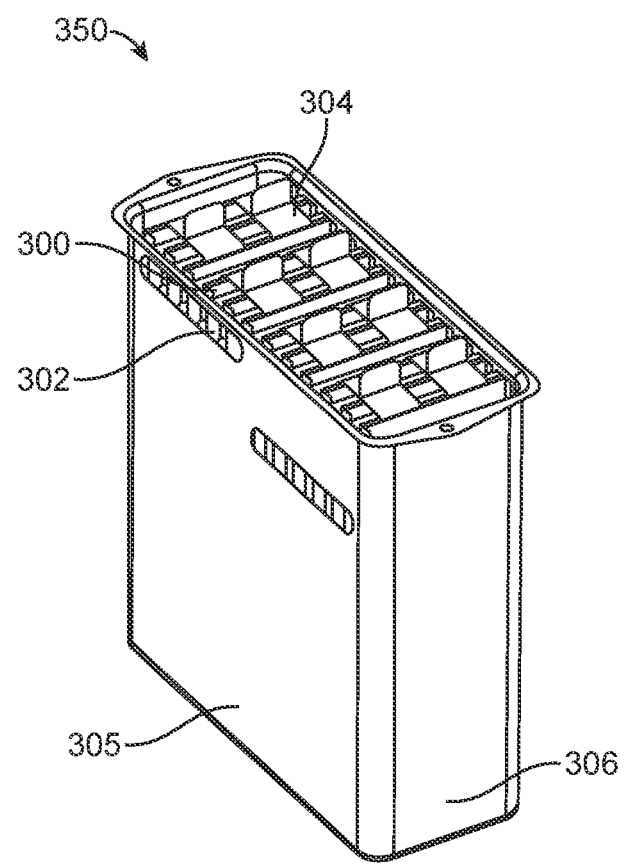
FIG. 3A illustrates an exemplary battery submodule with one or more strips of Phase Change Material (PCM), according to various embodiments.

As illustrated in FIG. 3A, the PCM layer 300 may be provided as a heat absorbent layer in the battery submodule 350. In some embodiments, the PCM layer 300 may be provided on top of the container 305, just below the lid. For example, the PCM layer 300 may be formed in form of one or more strips placed above the stack of battery cells and under the cell tabs and interconnects 304. The top of the cells has been shown to be a primary heat transfer path leading to thermal runaway propagation, especially if fire is observed. Thus, placing the PCM layer 300 on top of the battery submodule 350 will prevent fire from starting which limits total energy release (e.g. prevents the electrolyte in the battery submodule from igniting). In addition, placing the PCM layer 300 on top of the battery submodule 350 will also inhibit combustion of the top portion of the battery submodule 350, which is a secondary source of thermal energy in the battery submodule 350.

When thermal runaway propagation occurs in a battery submodule, one or more battery cells may break open in the top portion where the tab 304 is provided. This location is also where the adhesive keeping the battery cell enclosed is the weakest. When the battery cell pouch opens, a cloud of high pressure vaporized electrolyte is released within the battery submodule. The vaporized electrolyte has a tendency to ignite if the local temperatures are too high. Thus, by placing the PCM layer 300 on top of the battery cells, it is possible to maintain a constant temperature at the top (and remaining) portion of the battery submodule. In case of a thermal runaway propagation or an undesired temperature increase, the PCM layer 300 will absorb the heat and lower the temperature locally. By lowering the temperature of the top portion of the battery submodule where the vent gases accumulate, the PCM layer 300 prevents the vent gases from igniting (e.g. the PCM layer 300 prevents combustion).

In some embodiments, an exemplary battery submodule may include multiple layers of PCM 300, such as a bottom layer and a top layer provided in the container 305. The stack of battery cells may be sandwiched between the bottom PCM layer and the top PCM layer. In some embodiments, a PCM layer may also be formed as a front (and/or back) layer 306 to the stack of battery cells. Alternatively, the stack of battery cells may be enveloped in a PCM layer pouch, and then inserted into the container 305. In all these illustrative exemplary embodiments, the PCM layer 300 may be provided in addition to the thermally insulating layer 302, such as an aerogel.

Figure 3B:
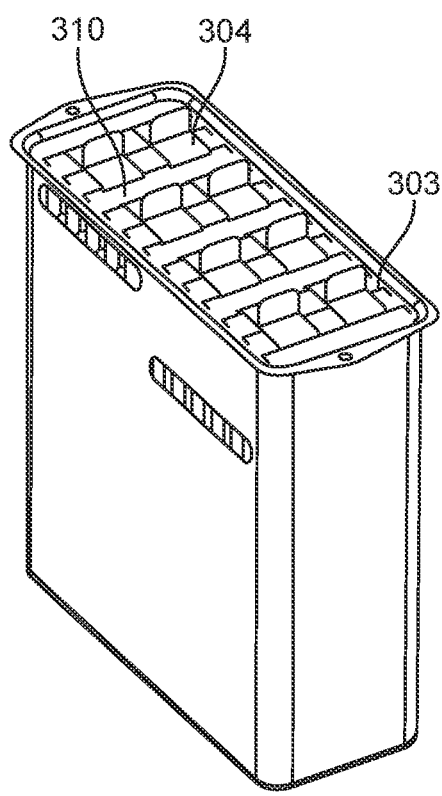
FIG. 3B illustrates an exemplary battery submodule with a continuous PCM layer, according to various embodiments.

As shown in FIG. 3A, the PCM layer 300 may be formed of multiple PCM pieces (e.g. strips). According to various embodiments, the PCM layer 310 may be a continuous layer (e.g. a film-like layer) placed at a desired location in the container 305 and/or on or around the stack of battery cells, as shown in FIG. 3B. The exemplary PCM layer 310 may include one or more openings 303 (e.g. slots) for receiving the cell tabs and interconnects 304. The PCM layer (300 or 310) may be coupled to the stack of battery cells via any suitable coupling means such as using an adhesive. In some embodiments, the PCM layer(s) may be kept in place via compression provided by the container 305 (and the lid).

If the PCM layer 300 or 310 is in gel form, the PCM layer 300 or 310 may be injected in the container 305 at desired locations.

Figure 4:
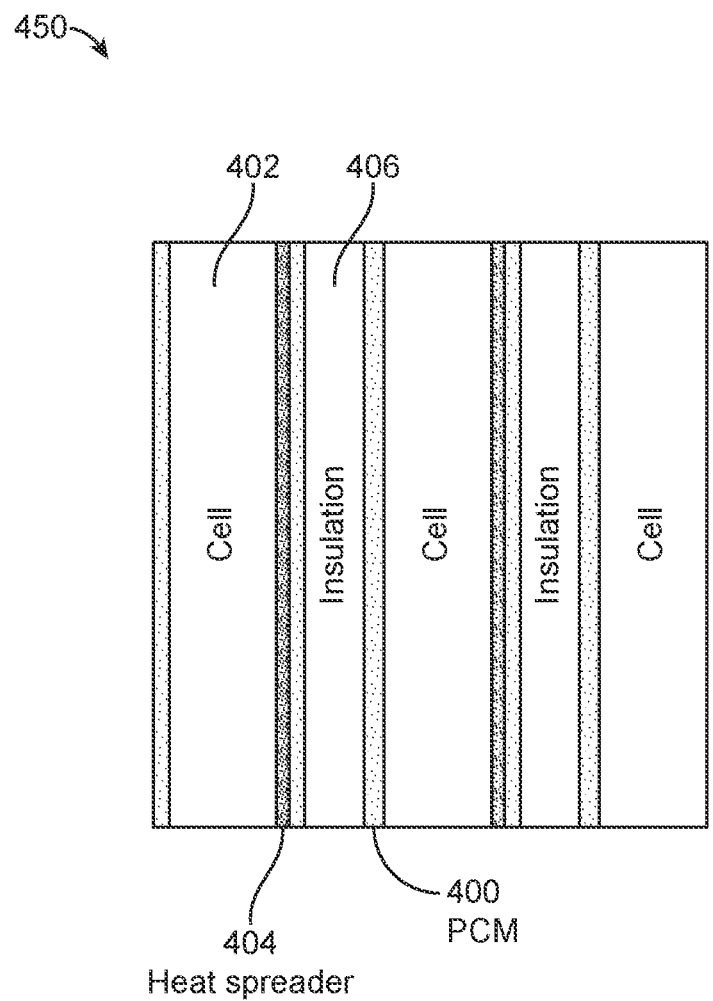
FIG. 4 illustrates an exemplary battery submodule with one or more PCM layers stacked with the one or more battery cells, according to various embodiments.

FIG. 4 illustrates another exemplary embodiment where a PCM layer 400 is formed as a stacked layer between battery cells. The exemplary battery submodule 450 illustrated in FIG. 4 includes a plurality of layers stacked in the following exemplary order: a PCM layer 400, a battery cell 402, a heat spreader 404, another PCM layer 400, a thermally insulating layer 406. These layers may be repeated to form the exemplary battery submodule 450. In this exemplary embodiment, the PCM layer 400 is provided between each pair of battery cells. The PCM layer(s) 400 is provided in addition to the thermally insulating layer(s) 406.

As explained above, the PCM layer 400 works independently and in a different manner than the thermally insulating layer 406. The thermally insulating layer 406 inhibits rapid heat leaking from an overheating battery cell, and thereby allows excess heat to slowly dissipate around the entire battery submodule instead of collecting in a local area. In contrast, the PCM layer 400 absorbs the excess heat. According to various embodiments, the thickness of the PCM layer 400 may be determined based on latent heat of fusion of PCM and the amount of energy released from the battery cell(s). Embodiments allow the PCM layer 400 to be thick enough to absorb energy released during normal operation, during overheating, and/or during failure of one or more battery cells.

The heat spreader 404 can receive heat from any point of contact with a battery cell 402, and conduct the heat quickly throughout the entirety of the heat spreader 404. This can functionally increase the contact surface area for transmitting heat to a PCM layer 400, as the heat spreader 404 can transmit heat to the PCM layer 400 at each PCM-spreader point of contact with an equal rate of transmission. As a result, the heat spreader 404 can assist with quickly transmitting heat from the battery cell 402 to the PCM layer 400. The insulation 406 can inhibit the transmission of heat from one battery cell region to another battery cell region.

Embodiments allow the battery submodule 450 layers to have other configurations. For example, in some embodiments, each battery cell 402 may be in contact with two heat spreaders 404, one on each side of the battery cell 402. Further, each heat spreader 404 may be followed by a PCM layer 400, and each PCM layer 400 may be followed by a thermally insulating layer 406, so that each battery cell 402 is sandwiched by two head spreaders 404, two PCM layers 400, and two thermally insulating layers 406. The layers surrounding the first and last battery cells may vary. For example, there may be no thermally insulating layers 406 at the very top or bottom of the battery cell stack.

In some embodiments, the PCM layer 400 may be used instead of the thermally insulating layer(s) 406. It may also be possible to place a PCM layer 400 after a set of (e.g. two or more) battery cells, without having to use a PCM layer 400 between each pair of battery cells. This layering may be possible due to the efficient heat absorption property of the PCM layer 400. This exemplary structure may provide additional volume and/or weight savings for a given battery submodule.

The PCM layer illustrated in the exemplary embodiments shown in FIGS. 3A-4 may be formed of PCM material, or may be formed of a substrate impregnated with, for example, intumescent coating.

For example, exemplary materials for the PCM layer 300 illustrated in FIGS. 3A-3B, and the PCM layer 400 illustrated in FIG. 4 may include a Phase Change Ceramic Separator. The ceramic separator has an integral hydrate PCM. The PCM may turn into a gas phase while the ceramic separator acts as a heat spreader.

In the case of the intumescent coating, exemplary materials for the PCM layer 300 may include Ceramic Paper Insulation with Intumescent Coating (e.g. Superwool® EST with IC100 Coating). An intumescent coating may be, for example, painted on layers of the battery submodule (e.g. the battery cell, the insulation layer, etc.). Thus, the layers of the battery submodule may be impregnated with the intumescent coating (PCM). In case of excess heat (or fire), the intumescent coating changes phase (e.g. turns into ash) while absorbing the heat. The latent heat of the intumescent coating may absorb the initial temperature spike of a potential thermal runaway in connection with a battery cell while the insulation prevents the remaining heat from spreading to the neighboring cells.

Figure 5:
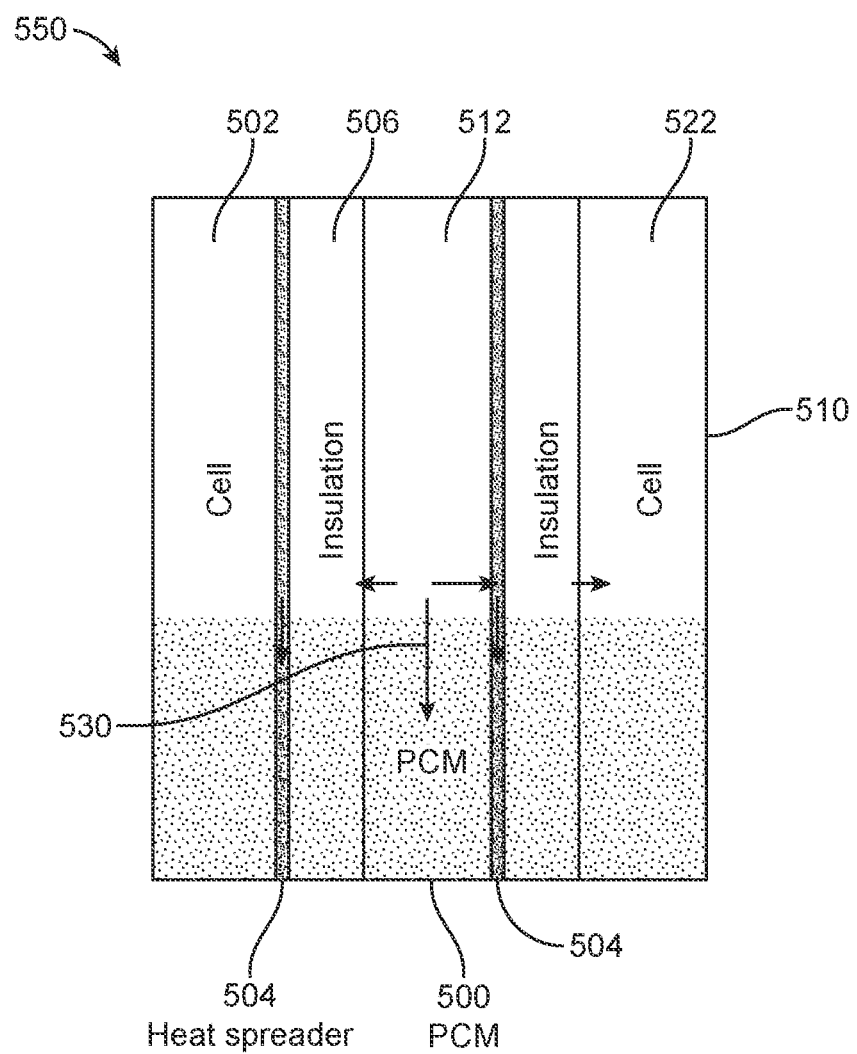
FIG. 5 illustrates an exemplary battery submodule with a PCM reservoir, according to various embodiments.

FIG. 5 illustrates another exemplary battery submodule 550 including liquid PCM layer 500. The stacked cells (e.g. stack of repeating pattern of a battery cell 502, a heat spreader 504, a thermally insulating layer 506) may be at least partially immersed in a volume of liquid PCM 500 (e.g. a PCM reservoir) within the container 510 containing the battery submodule 550. The volume of the liquid PCM should be minimized and only be sufficient to mitigate the effects of a single cell thermal runaway. In some embodiments, there may be any suitable volume of liquid PCM. For example, the volume of liquid PCM may be about 10 milliliters to about 100 milliliters depending on the configuration and size of the battery submodule 550. The embodiment illustrated in FIG. 5 may be tuned based on the performance of the battery submodule 550 (e.g. liquid PCM may be added to or removed from the container 510). Liquid PCM can advantageously contact and remove heat from multiple battery cells, so that same liquid PCM is useful for multiple scenarios where different battery cells may overheat. The same liquid PCM can essentially be shared by multiple battery cells. As a result, separate portions of PCM are not needed for each battery cell, and the total amount of PCM can be reduced, thereby reducing the weight of the battery submodule.

According to an exemplary embodiment, excess heat released in the middle battery cell 512 of the battery submodule 550 may be spread out as shown with heat vectors 530 in FIG. 5. While a larger amount of the heat may be absorbed by the liquid PCM 500, the thermally insulating layers 506 absorb some of the heat as well. The heat spreader 504 will direct (e.g. spread) the excess heat toward the liquid PCM 500 as shown with the heat vector. A minimal amount of excess heat may still be transferred to an adjacent cell 522 as shown with the heat vector.

In the exemplary battery submodule 550, the PCM may be used to enforce isothermal boundary conditions on an entire section of the submodule immersed in the PCM reservoir. When distributed throughout the submodule, the PCM may create a fin effect that makes all heat transfer preferential towards the PCM. In case of solid PCM (e.g. as in the exemplary embodiment illustrated in FIGS. 3A-4), the PCM layer may need to be continuous (e.g. the strips illustrated in FIG. 3A may not be ideal) and the material for the PCM layer may need to be highly conductive in order to achieve the fin effect similar to the PCM reservoir solution (as in the exemplary embodiment illustrated in FIG. 5).

According to various embodiments, the container 510 may be hermetically sealed. In embodiments where one or more vent holes are formed on the container 510, the vent hole(s) may be sealed, for example, using weather stripping or air tight tape. When a thermal runaway propagation occurs in the submodule, the heat may disintegrate (e.g. melt) the seal on the vent holes, thereby opening the vent holes to release the hot gases outside to an external environment of the battery submodule. If the battery submodule includes the liquid PCM layer as illustrated in FIG. 5, the seal over the vent holes may last longer as the liquid PCM layer will absorb the excess heat. In some embodiments, if the temperature of the submodule increases beyond a level that can be contained by the liquid PCM layer, the seals may melt to let the hot gases out. At that time, the liquid PCM may turn into a gas and does not pose a leak concern. For example, the seal material may be selected to have a melting temperature that is greater than the temperature at which the PCM undergoes a phase change (e.g., vaporization). As long as a portion of the PCM is undergoing phase change, the PCM can absorb excess heat from the battery cells without experiencing an increase in temperature or allowing the battery submodule temperature to increase. Once all of the PCM has changed phase (e.g., vaporized), the PCM temperature and the battery submodule temperature may increase beyond the PCM phase change temperature. Then, once the temperature rises to the point where the seals melt, the seals may melt to let hot gases escape the battery submodule.

Exemplary liquid PCM may include phase change dielectric liquid material (e.g. 3M™ Novec™ 7000) that boils at a low temperature, allowing for addition of thermal mass, that has low surface tension (good wicking capabilities), and good compatibility with engineering materials. An exemplary liquid PCM may also be electrically insulating. In certain embodiments, the liquid PCM may have low thermal conductivity. In addition, according to various embodiments, gases are intended to vent from the battery submodule, allowing for thermal energy dump. Accordingly, the material for the liquid PCM should not exhibit a condensing heat-phase. In certain embodiments, the container 510 can include one or more openings for adding additional liquid PCM and/or replacing PCM that has been vented. Openings for adding PCM may have removable caps and/or may be configured to allow insertion of fluids and gasses without allowing escape/leaking.

In some embodiments, a combination of liquid PCM and solid PCM can be utilized within the same battery submodule.

In some embodiments, a two or more types of PCM with different phase change temperatures can be included within the same battery submodule. This can create two different artificial temperature limits within the battery submodule; a first temperature limit provided by the first type of PCM with a first phase change temperature, and a second temperature limit provided by the second type of PCM with a second phase change temperature that is higher than the first phase change temperature. Two different temperature limits can assist with determining how much heat has been released from one or more battery cells, which can improve battery diagnostics and warning systems. For example, if temperature sensors indicate that the first temperature limit was reached, and then exceeded, it can indicate that the first type of PCM has been fully utilized (e.g., all of the first type of PCM has experienced a phase change). This can indicate how much heat has been released and absorbed (e.g., the amount of heat required to cause a complete phase change of the first type of PCM), and it can indicate that only one line of defense is remaining (e.g., the second type of PCM), which may trigger advanced warning systems. Further, using multiple types of PCM can be a way of controlling the temperature so that it is within a certain preferred temperature band (e.g., above the first temperature limit and below the second temperature limit). This can be advantageous, as battery cells may operate more efficiently at a slightly elevated temperature. Accordingly, the PCM-created temperature limits can be configured so that the submodule temperature is at or near an optimal temperature for battery cell performance.

Figure 6:
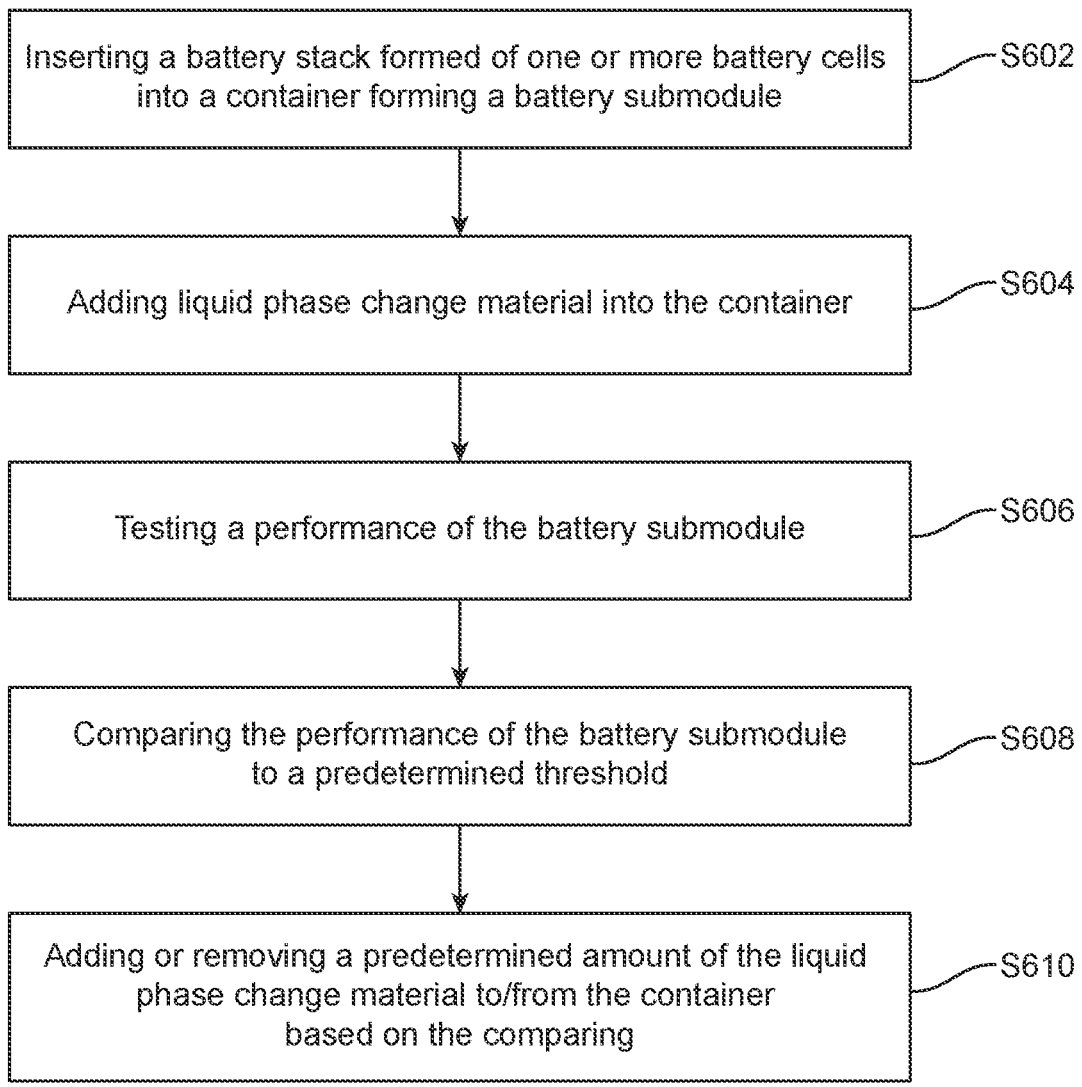
FIG. 6 illustrates an exemplary flowchart of steps for manufacturing an exemplary battery submodule with a PCM reservoir, according to various embodiments.

FIG. 6 illustrates an exemplary flowchart of steps for manufacturing an exemplary battery submodule with a PCM reservoir, according to various embodiments. At step 602, a battery stack formed of one or more battery cells is inserted into a container thereby forming a battery submodule. In some embodiments, the battery submodule may also include one or more layers of thermally insulating layers between the battery cells.

At step S604, an initial amount of liquid phase change material may be added into the container thereby forming a PCM reservoir in the container. The battery stack may be at least partially immersed in the PCM reservoir. The initial amount of the liquid phase change material may be about 10 milliliter to about 100 milliliters. The initial amount may be chosen so that there is enough liquid PCM to provide sufficient emergency cooling in the case of battery cell failure or other undesired temperature increase. The initial amount may be determined based on the latent heat of vaporization for the PCM and a predetermined expected voltage output of the battery submodule.

At step S606, the performance of the battery submodule may be tested using one or more testing methods to assess the voltage output of the battery submodule.

At step S608, the performance (e.g. the voltage output) of the battery submodule may be compared to a predetermined threshold value.

At step S608, based on the comparison outcome, the amount of the liquid phase change material may be adjusted by either adding more liquid phase change material to the container or by removing liquid phase change material from the container. For example, if the tested/measured voltage output is greater than the predetermined threshold value, the battery submodule may be capable of producing more heat. In this case, additional liquid PCM may be added to the container so that the total PCM has an increased heat-absorbing capacity. If the tested/measured voltage output is less than the predetermined threshold value, the battery submodule may be have a reduced heat-producing capabilities. In this case, some liquid PCM may be removed to the container as a reduced heat-absorbing capacity may be sufficient, and it may be advantageous to reduce the weight of the battery submodule. Once a desired level of liquid phase change material is achieved, the container may be hermetically sealed.

In some embodiments, a predetermined amount of liquid phase change material can be removed or added in step S608. Any suitable predetermined amount can be used, such as 1 milliliter, 5 milliliters, 10 milliliters, 15 milliliters, 20 milliliters, 25 milliliters, or 30 milliliters. In other embodiments, the amount of liquid phase change material to be removed or added can be calculated based on the difference between the tested performance and the predetermined threshold value.

Figure 7:
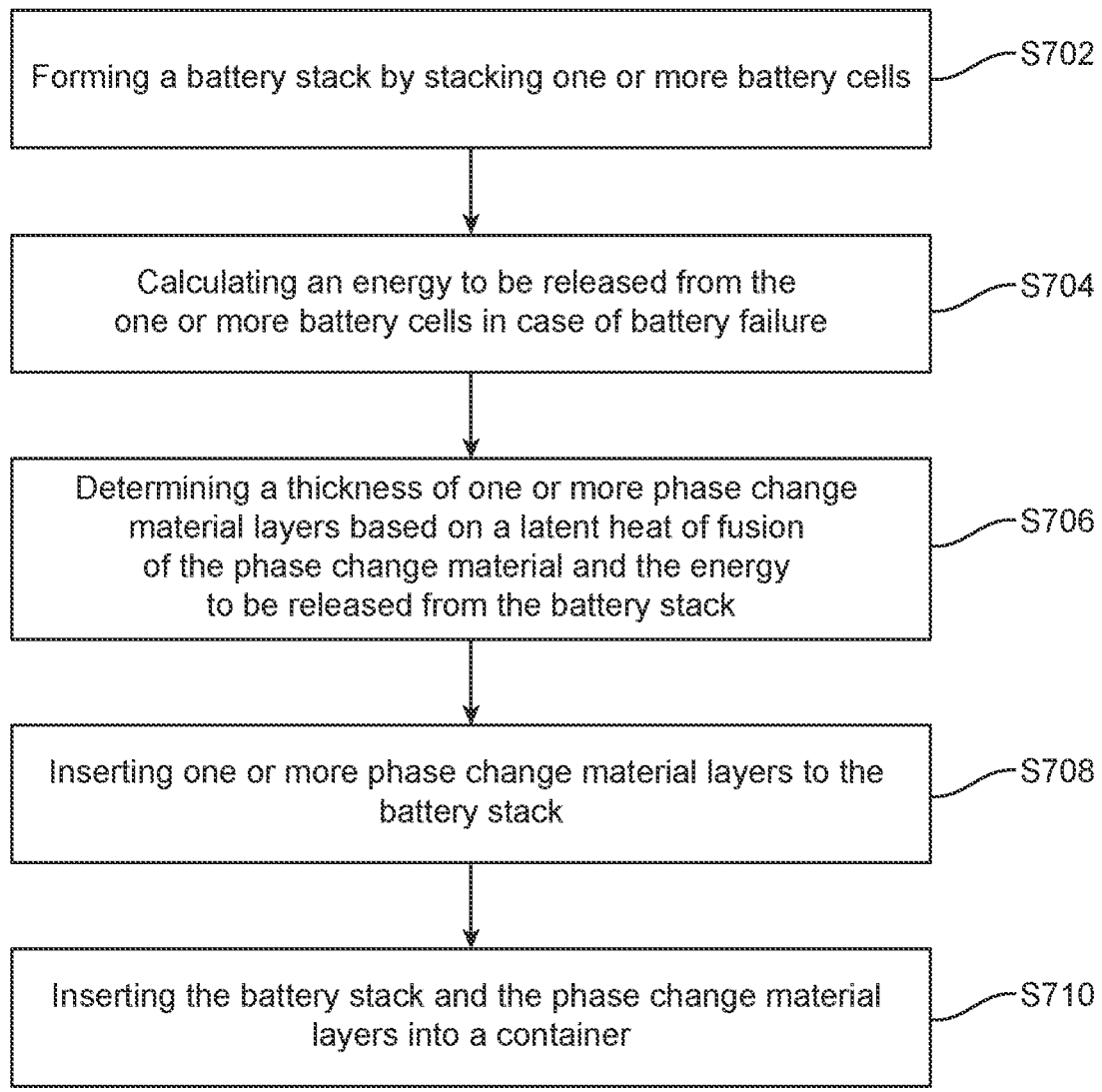
FIG. 7 illustrates an exemplary flowchart of steps for manufacturing an exemplary battery submodule with one or more PCM layers, according to various embodiments.

FIG. 7 illustrates an exemplary flowchart of steps for manufacturing an exemplary battery submodule with one or more PCM layers, according to various embodiments. At step 702, a battery stack formed by stacking one or more battery cells. In some embodiments, the battery stack may also include one or more layers of thermally insulating layers between the battery cells.

At step S704, an energy level that is to be released from the one or more battery cells in case of battery failure is calculated. The calculation can be made for a single battery cell failure, two battery cells failing, all battery cells failing, or any other suitable number of battery cell failures. The calculation may be based on certain characteristics and configurations of the one or more battery cells, such as the total amount of stored energy in one or more battery cells, and the maximum voltage output of the one or more battery cells. In some embodiments, the calculation can include measuring the energy released during a battery failure test.

At step S706, the thickness of one or more phase change material layers are determined based on the calculated energy level to be released from the battery stack in case of failure and one or more characteristics of the phase change material. For example, the latent heat of fusion of the phase change material, which describes how much heat energy is absorbed during a melting process of the phase change material, may be used to determine the thickness of one or more phase change material. The thickness can be configured so that a sufficient amount of phase change material is included. In some embodiments, it may be desirable to include an amount of phase change material that is sufficient to absorb an amount of energy that is to be released if one battery cell fails, two battery cells fail, all battery cells fail, or any other suitable number of battery cells fail. In some embodiments, the amount of phase change material may be set to absorb enough of the energy released during battery failure so that thermal runaway is prevented. This may be less than the total amount of energy released during battery cell failure, as some thermal energy may dissipate, and some temperature increase within the battery submodule may be tolerable.

At step S708, one or more phase change material layers are inserted in the battery stack. The thickness of the one or more phase change material layers may be the amount determined at step S706. For example, the one or more phase change material layers may be inserted between the one or more battery cells. The one or more phase change material layers may also be added at the bottom, top or sides of the battery stack. In some embodiments, the battery stack may be wrapped in (e.g. enveloped by) the one or more phase change material layers. In some embodiments, step S702 and step S708 may take place simultaneously, so that the phase change material layers are added during the process of stacking the one or more battery cells.

At step S710, the battery stack and the phase material layers may be inserted into a container thereby forming a battery submodule.

Embodiments provide a PCM layer that absorbs excess heat in a battery submodule while occupying a minimal amount of volume, especially when compared to conventional thermally insulating materials. This property becomes especially important for batteries used in aircrafts (e.g. electric aircrafts). The electric aircrafts may be subject to stringent volume and weight constraints. The use of PCM layers instead of conventional thermally insulating materials enable meeting the volume and weight constraints in an efficient manner.

While the invention has been described with reference to specific embodiments, those skilled in the art with access to this disclosure will appreciate that variations and modifications are possible. Battery submodules described herein can include any number of battery cells, and the systems and processes can be adapted to cells implemented using a variety of battery technologies.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A battery submodule comprising:
   a container;
   a battery stack formed of a plurality of battery cells provided within the container; and
   a phase change material provided within the container, wherein the phase change material is configured to absorb heat released from the battery stack, wherein the phase change material includes a plurality of solid layers of phase change material, the plurality of solid layers of phase change material including:
   a first continuous layer provided on a top external surface of the battery stack and in contact with each of the plurality of battery cells;
   a second continuous layer provided on a bottom external surface of the battery stack and in contact with each of the plurality of battery cells;
   a third continuous layer provided on a first external side surface of the battery stack; and
   a fourth continuous layer provided on a second external side surface of the battery stack, such that each of the plurality of battery cells are positioned between the third continuous layer and the fourth continuous layer.

2. The battery submodule of claim 1, wherein the plurality of solid layers of phase change material further include a fifth continuous layer provided between the plurality of battery cells.

3. The battery submodule of claim 1, wherein the phase change material includes a predetermined amount of liquid phase change material provided within the container, wherein the battery stack is at least partially immersed in the liquid phase change material.

4. The battery submodule of claim 3, wherein the predetermined amount is about 1 milliliter to about 30 milliliters.

5. The battery submodule of claim 1, wherein at least one layer in the battery stack is impregnated with the phase change material.

6. The battery submodule of claim 5, wherein the phase change material includes intumescent coating.

7. The battery submodule of claim 1, wherein the container is configured to compress the battery stack and the phase change material provided therein.

8. The battery submodule of claim 1, wherein a first property of the phase change material is a phase change temperature, wherein a second property of the battery submodule is a critical temperature at which the battery submodule experiences a thermal runaway, and wherein the phase change temperature is less than the critical temperature.

9. The battery submodule of claim 1, wherein the plurality of solid layers of phase change material further include a fifth continuous layer provided between two of the plurality of battery cells, and wherein the phase change material further includes:
   a predetermined amount of liquid phase change material provided within the container, wherein the battery stack is at least partially immersed in the liquid phase change material.

10. The battery submodule of claim 1, wherein the plurality of solid layers of phase change material further include:
   a fifth continuous layer provided on a third side surface of the battery stack; and
   a sixth continuous layer provided on a fourth side surface of the battery stack.

11. The battery submodule of claim 1, wherein the first continuous layer completely covers the top external surface of the battery stack, and the second continuous layer completely covers the bottom external surface of the battery stack, and wherein the battery stack is wrapped in the plurality of solid layers of phase change material.

12. The battery submodule of claim 1, wherein the first continuous layer is a first thin film layer positioned between a first wall of the container and the top external surface of the battery stack, and the second continuous layer is a second thin film layer positioned between a second wall of the container and the bottom external surface of the battery stack.

13. A battery submodule comprising:
 a container;
 a battery stack formed of one or more battery cells provided within the container;
 a phase change material provided within the container, wherein the phase change material is configured to absorb heat released from the battery stack, the phase change material includes one or more solid layers of phase change material stacked with the one or more battery cells, and the one or more solid layers of phase change material are provided between the one or more battery cells; and
 one or more thermal insulation layers stacked with the one or more battery cells, and the one or more thermal insulation layers are provided between the one or more battery cells.

14. The battery submodule of claim 13, wherein the one or more thermal insulation layers include aerogel.

15. The battery submodule of claim 13, further comprising:
 a plurality of heat spreaders provided within the container, wherein each of the one or more battery cells is positioned adjacent to a first respective heat spreader from the plurality of heat spreaders on a first side of the battery cell and a second respective heat spreader from the plurality of heat spreaders on a second side of the battery cell, and wherein of the plurality of heat spreaders is positioned adjacent to a respective solid layer of phase change material from the one or more solid layers of phase change material.

16. The battery submodule of claim 15, wherein each of the one or more solid layers of phase change material is positioned adjacent to a respective thermal insulation layer from the one or more thermal insulation layers.

17. The battery submodule of claim 13, wherein the phase change material further includes:
 a first layer provided on a top surface of the battery stack; and
 a second layer provided on a bottom surface of the battery stack.

18. The battery submodule of claim 17, wherein the phase change material further includes:
 a third layer provided on a first side surface of the battery stack; and
 a fourth layer provided on a second side surface of the battery stack.

19. The battery submodule of claim 18, wherein the phase change material further includes:
 a fifth layer provided on a third side surface of the battery stack; and
 a sixth layer provided on a fourth side surface of the battery stack.

20. The battery submodule of claim 13, wherein the phase change material further includes a predetermined amount of liquid phase change material provided within the container, wherein the battery stack is at least partially immersed in the liquid phase change material.

* * * * *